US006634663B2

(12) United States Patent
Mitchell

(10) Patent No.: US 6,634,663 B2
(45) Date of Patent: Oct. 21, 2003

(54) WHEELCHAIR PROPULSION KIT

(76) Inventor: Raymond L. Mitchell, 7, Chemin Côte Ste-Catherine, Apt. 1204, Montreal, Quebec (CA), H2V 1Z9

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 157 days.

(21) Appl. No.: 09/236,368

(22) Filed: Jan. 25, 1999

(65) Prior Publication Data

US 2002/0043781 A1 Apr. 18, 2002

Related U.S. Application Data

(63) Continuation-in-part of application No. PCT/CA97/00524, filed on Jul. 22, 1997.

(60) Provisional application No. 60/022,068, filed on Jul. 23, 1996.

(51) Int. Cl.[7] .................................................. B62M 1/14

(52) U.S. Cl. .................................. 280/250.1; 280/304.1

(58) Field of Search .............................. 280/250.1, 244, 280/304.1, 253, 254.1, 242.1

(56) References Cited

U.S. PATENT DOCUMENTS

| | | | | | |
|---|---|---|---|---|---|
| 3,189,368 | A | * | 6/1965 | Petersen | 280/250.1 |
| 3,869,146 | A | * | 3/1975 | Bulmer | 280/250.1 |
| 3,877,725 | A | * | 4/1975 | Barroza | 280/250.1 |
| 4,358,126 | A | * | 11/1982 | Mitchell et al. | 280/250.1 |
| 5,263,729 | A | * | 11/1993 | Watwood et al. | 280/250.1 |
| 5,303,945 | A | * | 4/1994 | Oxford | 280/250.1 |
| 5,988,661 | A | * | 11/1999 | Garfinkle | 280/250.1 |

FOREIGN PATENT DOCUMENTS

| | | | | |
|---|---|---|---|---|
| DE | 3413312 | * | 1/1986 | 280/250.1 |
| DE | 3610055 | * | 10/1987 | 280/250.1 |
| GB | 2213438 | * | 8/1989 | 280/250.1 |
| WO | WO 90/07316 | * | 7/1990 | 280/250.1 |

* cited by examiner

*Primary Examiner*—Brian L. Johnson
*Assistant Examiner*—Hau Phan
(74) *Attorney, Agent, or Firm*—Swabey Ogilvy Renault

(57) ABSTRACT

A manual propulsion kit for a wheelchair when the wheelchair includes a frame with two large wheels on either side of the frame journaled to axles on the frame, each of the large wheels mounting a circular handrail. The kit including a pair of manual propulsion assemblies wherein each assembly includes a lever adapted to be journaled to one of the axles for rotational movement within a predetermined angular sector determined by a substantially vertical neutral position and a position forward of the frame. A crank handle having a crank web member is pivoted for rotation, at the end of the lever arm adjacent the handrail when the lever arm is mounted to the axle, such that the crank web member moves between a neutral position disengaged from the handrail and a forward position engaged with the handrail. A crank handle grip is mounted to the crank web member. Friction pads are associated with the crank web member adapted to engage the handrail when pressure is applied to the crank handle to move the web member to a forward position whereby the manual propulsion assembly can be utilized to propel the wheelchair forwardly or rearwardly.

8 Claims, 14 Drawing Sheets

WHEELCHAIR PROPULSION KIT

CROSS-REFERENCE TO RELATED APPLICATION

This application is a continuation-in-part application of International Application Serial No. PCT/CA97/00524 filed Jul. 22, 1997, and claim benefit of Prov. No. 60/022,068 filed Jul. 23, 1996.

BACKGROUND OF THE INVENTION

1. Field of the Invention

The present invention relates to wheelchairs and more particularly to hand or manual propulsion accessories to enable a wheelchair occupant to more readily propel the wheelchair in forward or rearward directions.

2. Description of the Prior Art

Although several hand propulsion devices have been developed for conventional wheelchairs, most wheelchairs are still propelled by the occupant driving the circular handrail attached to the side of each wheel. The reason appears to be the complexity of operating most such prior art devices. Devices such as shown in U.S. Pat. No. 3,189,368 Petersen 1965; U.S. Pat. No. 3,869,146 Bulmer 1975 and U.S. Pat. No. 5,263,729 Watwood 1993 are all representative of devices that must engage the periphery of the respective wheel. It is evident that the wheels of a wheelchairs are subject to wear, thereby creating adjustment problems for most of these prior art devices, as well as the fact that the periphery of the wheels collect dirt as well as road salt causing further problems in the operation of these mechanisms.

U.S. Pat. No. 3,877,725 Barroza 1975 and U.S. Pat. No. 4,354,691 Saunders et al 1982, describe hand propulsion devices that at least in part engage the handrail attached to the respective wheels on the wheelchair. Saunders et al includes a complicated structure requiring a specially designed handrail with a series of openings provided therein to cooperate with a lever arm having a bracket with a lug that must engage the openings in the handrail when the lever is pressed outwardly and then drives the wheelchair when the lever is pushed forwardly. The Barroza device is somewhat simpler and includes upper and lower pads that jam against the handrail to push forward or rearward the wheelchair. A brake pad engages the periphery of the wheel.

Many older people develop physical handicaps at a late stage in their lives requiring that they adapt themselves to the confines of a wheelchair and learn how to propel and navigate the wheelchair. Although hand propulsion devices according to the prior art can increase the mechanical advantage and thereby reduce the force that such occupants must exert to propel a wheelchair equipped with such devices, the relatively complicated manipulations required to operate the prior art devices, deters from their use.

In practically all prior art hand propulsion devices, the installation of such devices requires alterations to the wheelchair. In many cases, such as Saunders et al, a special handrail is necessary. Few if any prior art devices can be easily retrofitted to existing wheelchairs.

SUMMARY OF THE INVENTION

It is an aim of the present invention to provide an improved hand propulsion apparatus that can be mounted to existing conventional wheelchairs without modifications to the wheelchair.

It is a further aim of the present invention to provide an improved hand propulsion apparatus for a wheelchair that is simpler to operate by the occupant than the devices suggested by the prior art.

It is a still further aim of the present invention to provide a manual propulsion kit that is simpler in construction and requires fewer parts than the known hand propulsion devices.

A construction in accordance with the present invention comprises a manual propulsion kit for a wheelchair wherein the wheelchair includes a frame with two large wheels on either side of the frame and journaled to axles on the frame, each of the large wheels mounting a circular handrail, the kit including a pair of manual propulsion assemblies wherein each assembly includes a lever arm adapted to be journaled to the axle for rotational movement within a predetermined angular sector determined by a substantially vertical position and a position forward of the frame, a crank handle having a crank web member pivoted for rotation, at the end of the lever arm adjacent the handrail when the lever arm is mounted to the axle, about an axis coincident with the lever arm such that the crank member defines an arc and moves between a forward position forward of the lever arm, at a tangent to the handrail, and a reverse position extending rearward of the lever arm and at a tangent to the handrail, a crank handle grip mounted to the crank web member, friction means associated with the crank web member adapted to engage the handrail when pressure is applied to the crank handle grip, when the crank handle is in one of the forward and reverse positions whereby the manual propulsion assembly can be utilized to propel the wheelchair forwardly or rearwardly.

More specifically the friction means is in the form of at least a friction pad mounted to a backing plate that is fixedly mounted to the crank handle grip but underneath the crank web and the backing plate with the crank handle grip are journaled to the crank web so that the at least one friction pad can engage the handrail whether the crank handle is in the forward or reverse position.

In another embodiment of the present invention the friction means includes a bracket that is pivotally mounted to the lever arm adjacent and below the crank handle and the bracket includes a forward component extending forward of the lever arm and a rearward component extending rearwardly thereof and both components extend in a plane tangential to the handrail, and friction pads are mounted to the bracket components adapted to engage the handrail when pressure is applied to the crank handle in one of the forward and reverse positions.

BRIEF DESCRIPTION OF THE DRAWINGS

FIG. 20 is a top plan view of the embodiment shown in FIG. 16 while

DESCRIPTION OF THE PREFERRED EMBODIMENTS

Figure 1:
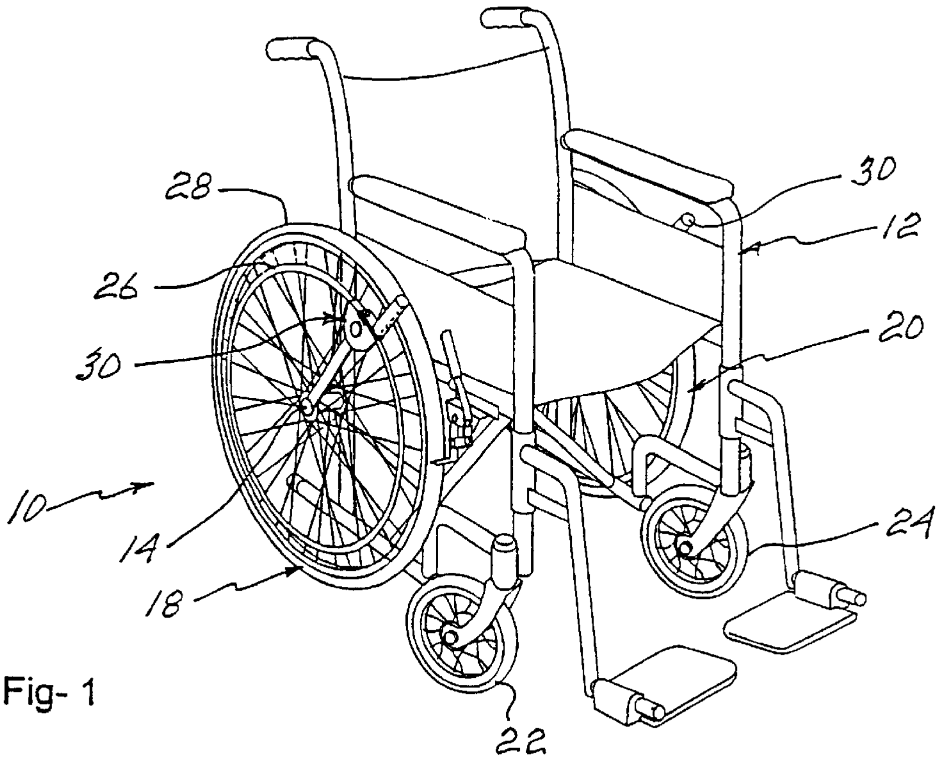
FIG. 1 is a perspective view of a wheelchair incorporating the present invention.
Figure 2:
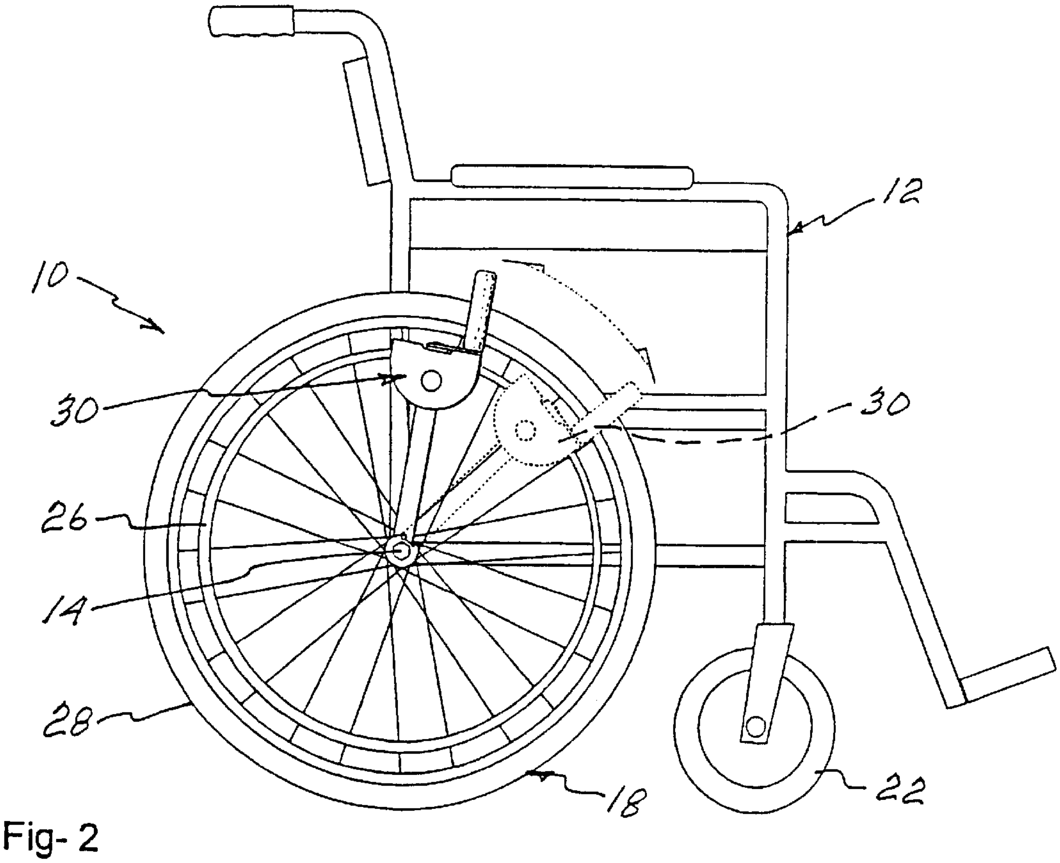
FIG. 2 is a side elevation of the wheelchair shown in FIG. 1.

Referring now to FIGS. 1 and 2 there is shown a wheelchair 10 having a frame 12, and axles 14 extending on the either side of the frame to mount large wheels 18 and 20. As on conventional wheelchairs small caster wheels 22 and 24 are located on the front of the frame 12. The large wheels 18 and 20 both mount a circular handrail 26. Since both sides of the wheelchair are mirror images, only wheel 18 will be described. Thus, wheel 18 has a peripheral rubber tire 28.

Figure 3:
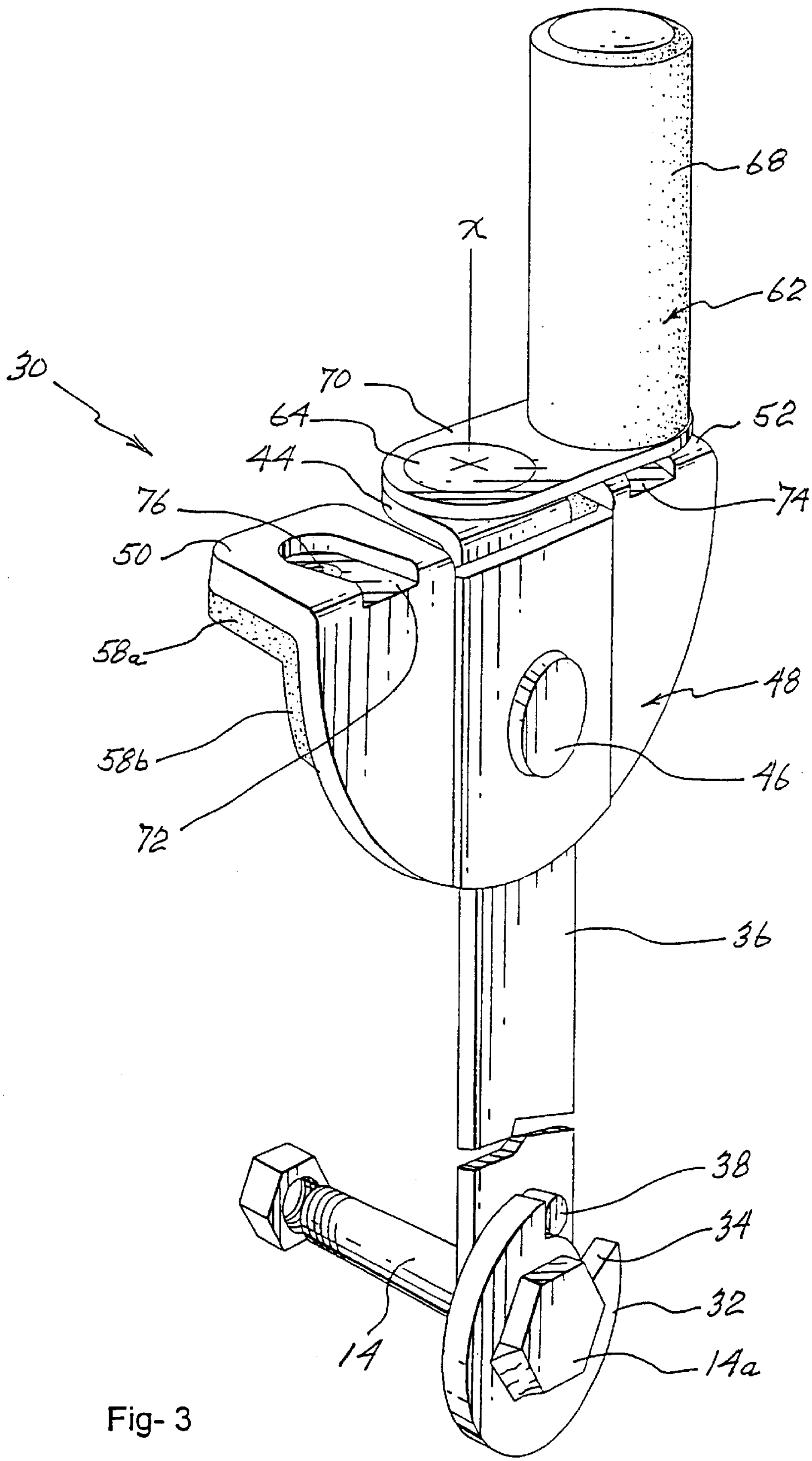
FIG. 3 is an enlarged perspective fragmentary view of the present invention.
Figure 5:
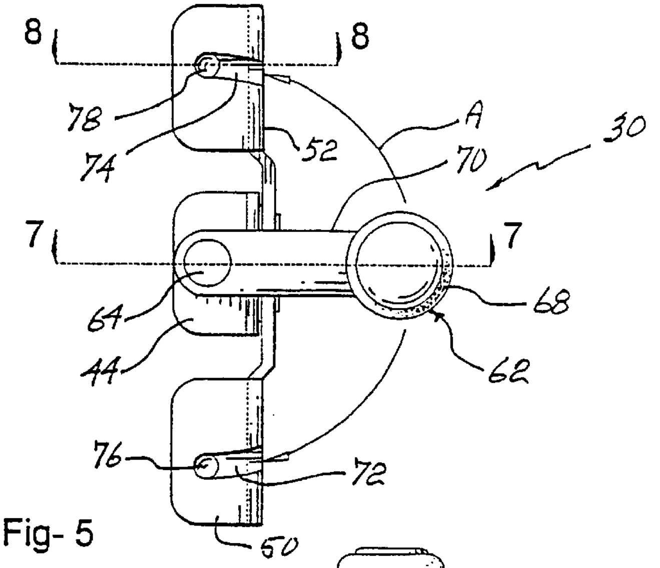
FIG. 5 is a top plan view of the embodiment shown in FIG. 4.
Figure 4:
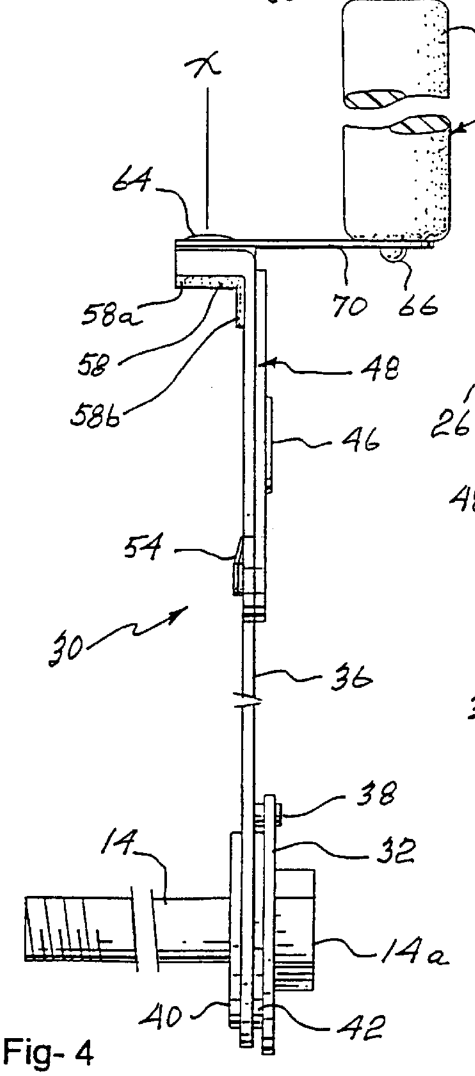
FIG. 4 is an end elevation of the embodiment shown in FIG. 3 in an inoperative position.

As seen in FIGS. 1 and 2, and more specifically in FIG. 3, a manual propulsion assembly 30 is provided. The manual propulsion assembly 30 is journaled to the axle 14 as shown in FIGS. 3 and 4 and is maintained by thrust bearings 40 and 42. A washer 32 is fixed to the axle 14, and may be tack welded to the head 14*a* of the axle 14.

An angular segment 34 is cut out in the washer 32 to accommodate a pin 38 mounted to the lever 36. As will be seen, the cut out portion 34 will limit the rotational travel of the lever 36. A pin 38 on lever arm 36 will travel in cut out portion 34 and will come into contact with the ends of the cut out portion 34 limiting the rotation of lever arm 36. The angular sector defined by the cut out portion 34 is preferably 35°.

Figure 6:
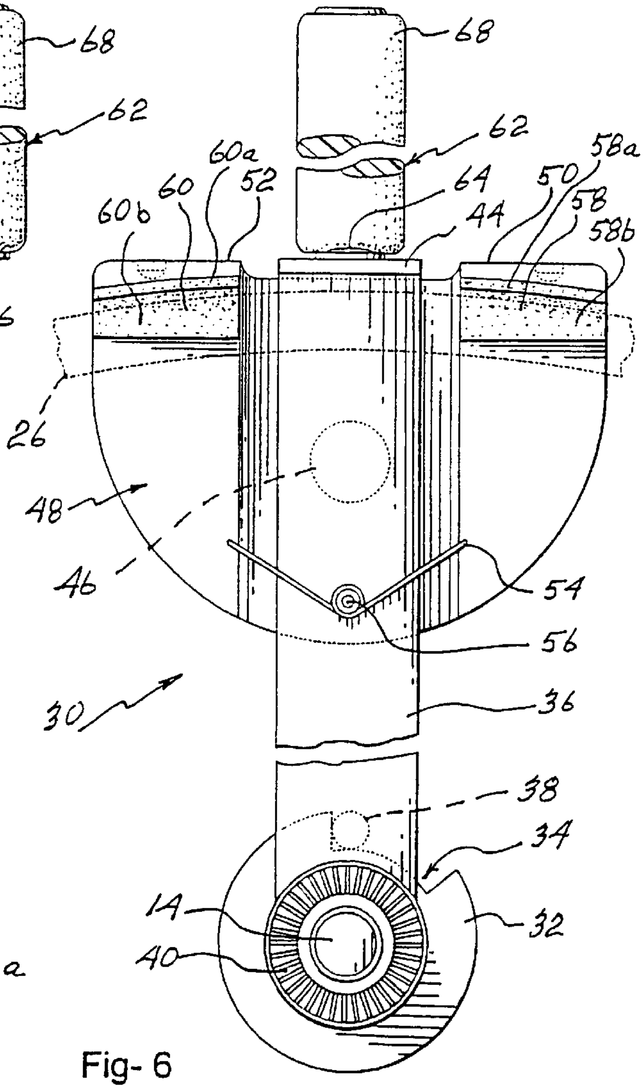
FIG. 6 is a side elevation of the embodiment shown in FIGS. 4 and 5.
Figure 7:
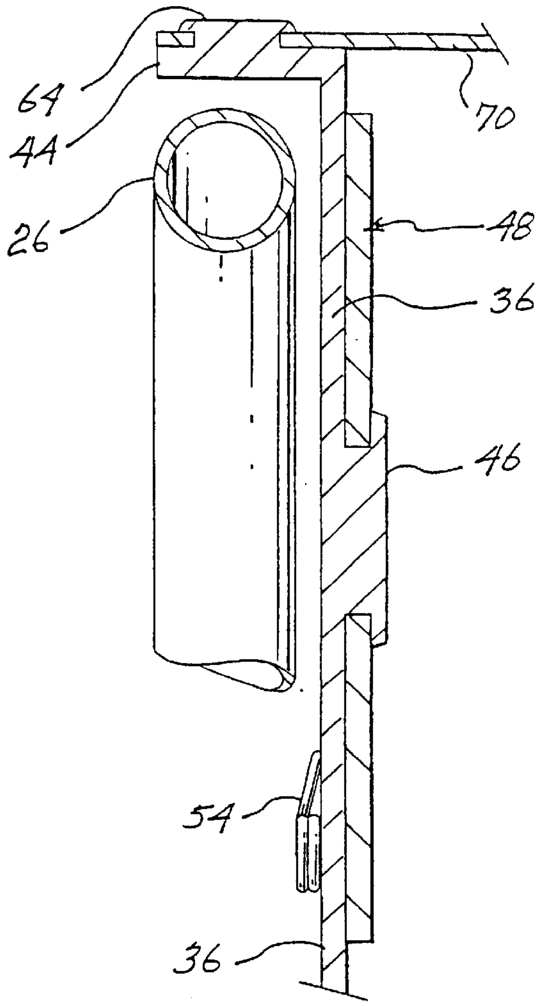
FIG. 7 is a fragmentary cross-section taken along lines 7—7 of FIG. 5.

The top of the lever arm 36 as shown in FIGS. 3 to 6 is provided with a platform 44 at an angle of 90° to the plane of the lever arm 36. The platform 44 intersects the plane of the handrail 26 as shown in FIG. 7.

Figure 8:
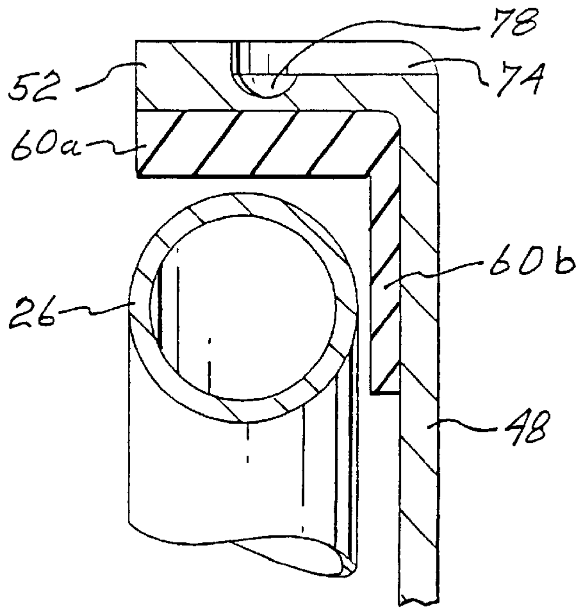
FIG. 8 is a fragmentary vertical cross-section taken along lines 8—8 of FIG. 5.

A pivot pin 46 is mounted on the lever arm 36 below the platform 44 to mount rocker bracket 48 which is allowed to rotate about the pivot pin 46. The rocker bracket 48 includes a pair of wings 50 and 52. As shown in FIG. 6, a spring 54 urges the rocker bracket 48 to a neutral position. The wings 50 and 52 are angled and their axial components extend over the handrail 26 as shown in FIG. 8. Both wings 50 and 52 are provided with rubber pads 58 and 60 respectively. For instance the rubber pad 58 includes an axial component 58*a* and a radial component 58*b* mounted within the wing 50 of the rocker bracket 48. Likewise, rubber pad 60 includes an axial component 60*a* and a radial component 60*b*. It is clear that any pressure which is ultimately applied to wing 50 or wing 52 will cause the pad component 58 or the pad component 60 to frictionally engage the handrail 26 as will be described further.

Figure 9:
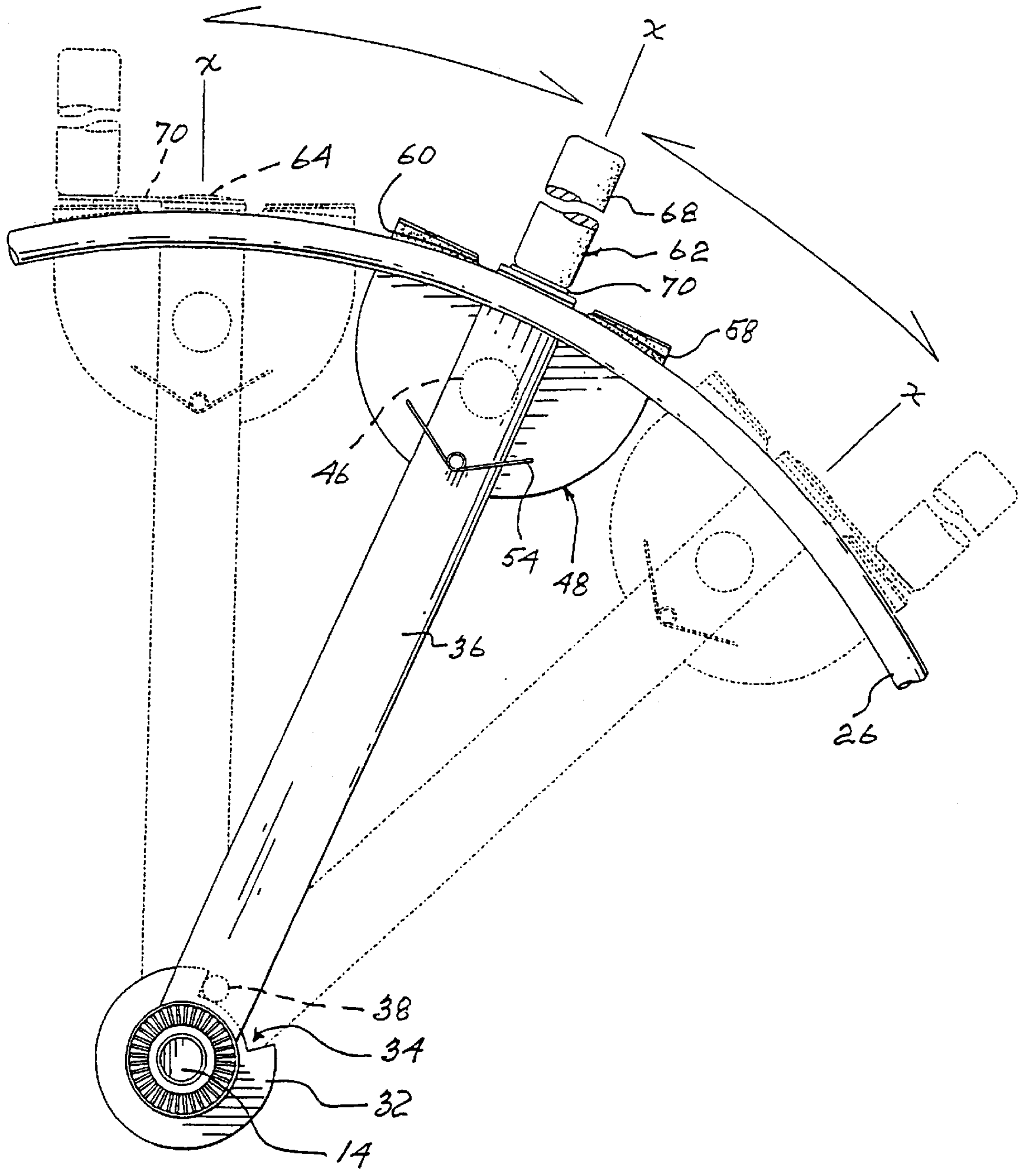
FIG. 9 is a side elevation showing the present invention in different operable positions.

Mounted to the platform 44 is a crank handle 62 having a crank web 70. A pivot pin 64 mounts the crank web 70 for rotational movement about the axis X as shown in FIG. 3. A handle grip 68 is journaled to the crank web 70. A spring mounted detent 66 projects below the handle grip 68 and crank web 70. The crank web 70, in this particular embodiment, is a flat strap of spring steel. The wings 50, 52 each include a slot 72 or 74 and recesses 76, 78, respectively. For instance, when (FIG. 9) the handle grip is grasped by an occupant in the wheelchair and pushed forward relative to the frame the detent 66 enters the slot 74 and engage the recess 78. Further force applied forward on the grip 68 will cause rocker bracket 48 to rotate and the pad 60*a* to engage the handrail 26, and entrain the handrail to move forward, thereby moving the wheel 18. When the lever arm has reached its forward limit, the pressure on the grip 68 is released and the crank handle 62 and lever arm 36 are returned to the almost vertical position shown in FIG. 2, and the action is repeated. If both propulsion assemblies 30 are simultaneously operated in this manner, the wheelchair will advance.

If it is required to reverse the movement of the wheelchair the handgrip 68 and web 70 can be rotated about the axis X until the detent 66 engages in the slot 72 and recess 76 on the wing 50. Further downward pressure will bend the crank web 70 and thus rotate the rocker bracket to frictionally press the pad 58*a* against handrail 26. Further rearward force by the occupant simultaneously on both propulsion assemblies 30 will cause the handrails 26 to move and thus entrain the wheels 18 and 20 to rotate rearwardly moving the wheelchair rearwardly. Then the pressure is released and this action is repeated. If it is required to turn the wheelchair the propulsion mechanisms can be operated in an inverse direction, that is with one handgrip being moved forwardly while the other handgrip is rotated and moved rearwardly.

In order to apply the brakes to the wheelchair the handle grips 68 are moved inwardly towards the wheelchair 10 so that the friction pads 58*b* or 60*b* come into frictional engagement with the handrail 26.

Referring now to FIGS. 10 through 15 there is shown another embodiment of the present invention. All the elements which are similar to elements in the embodiment of FIGS. 1 to 9 have been designated by similar reference numerals but have been raised by 100.

Figure 10:
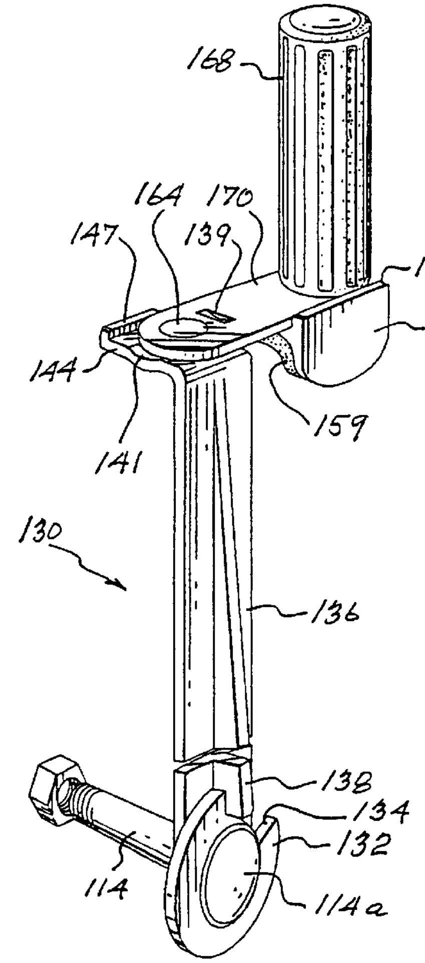
FIG. 10 is a perspective view similar to FIG. 3 showing a different embodiment of the present invention.
Figure 12:
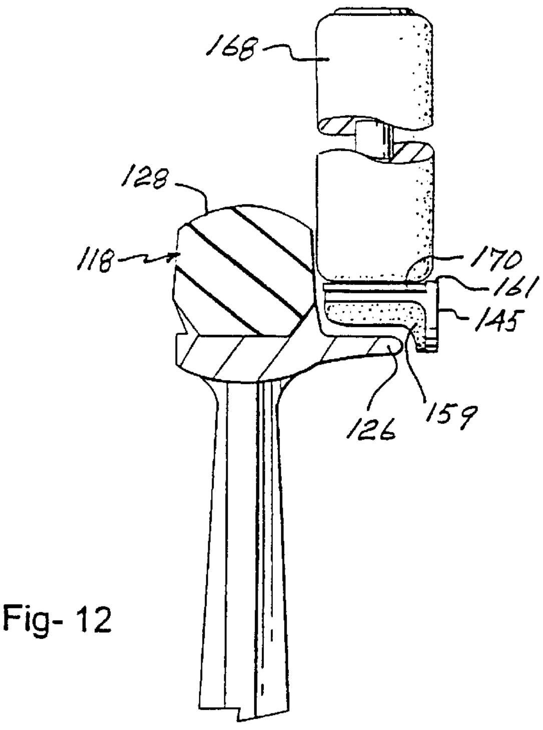
FIG. 12 is a fragmentary cross-section taken along lines 12—12 of FIG. 11.
Figure 14:
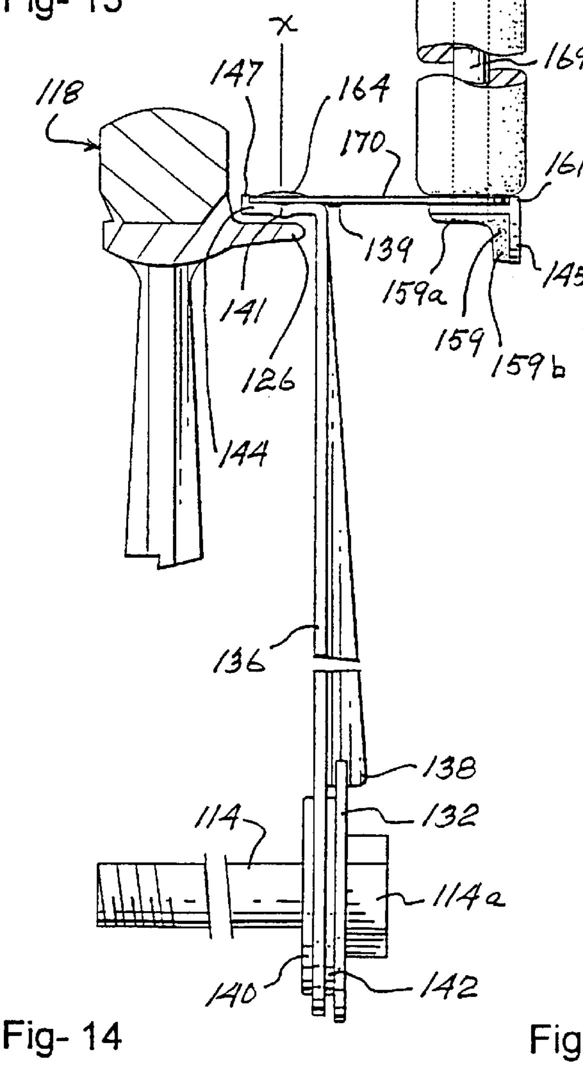
FIG. 14 is a radial cross-section taken along lines 14—14 of FIG. 13.
Figure 15:
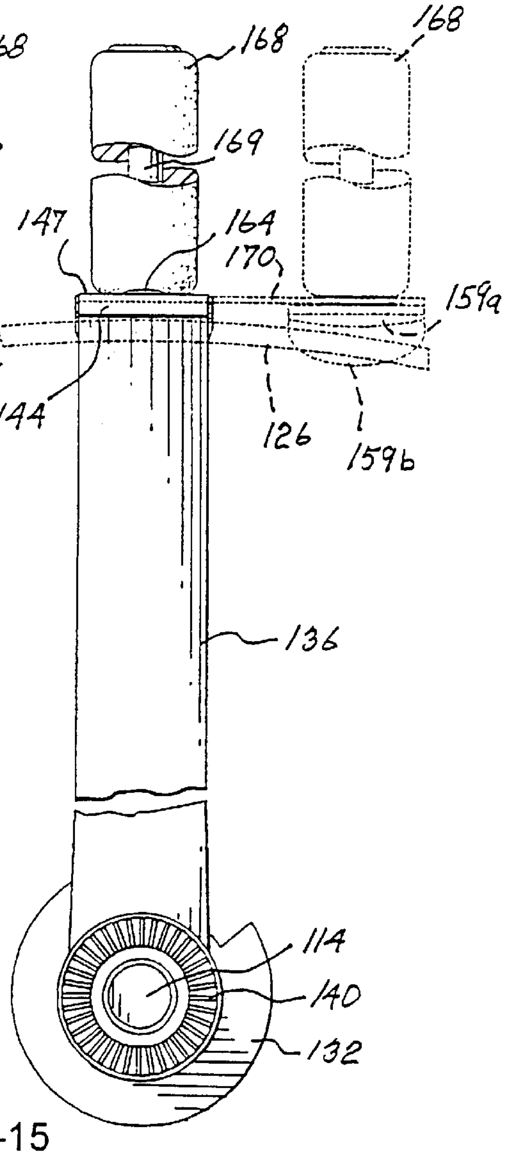
FIG. 15 is a side elevation of the embodiment shown in FIGS. 13 and 14.
Figure 16:
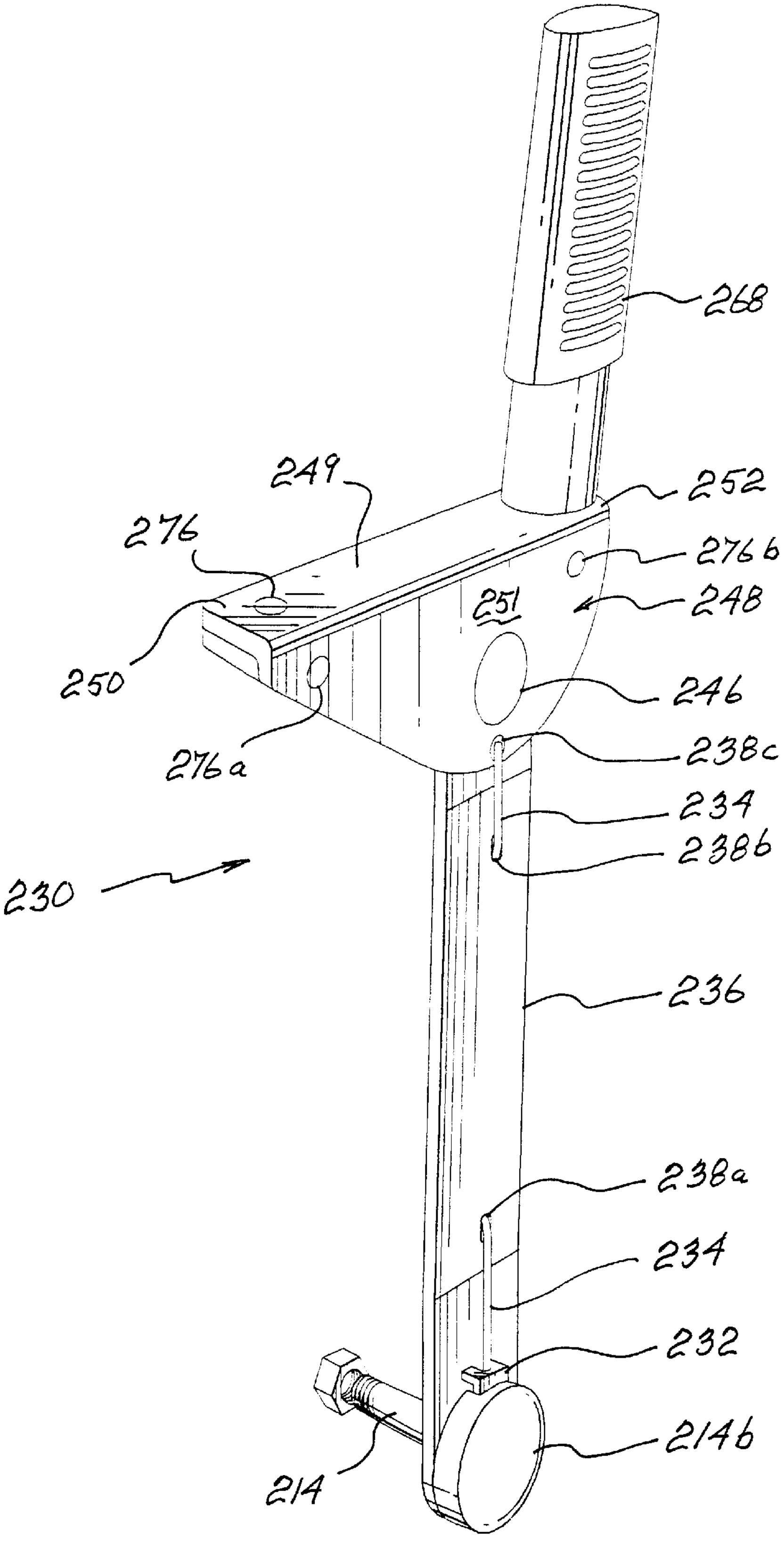
FIG. 16 is a perspective view of another embodiment of the manual propulsion assembly, in accordance with the present invention.
Figure 21:
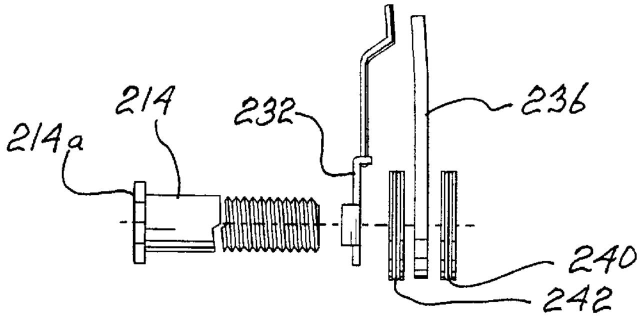
FIG. 21 is a fragmentary exploded view of a detail of the embodiment shown in FIG. 16.
Figure 17:
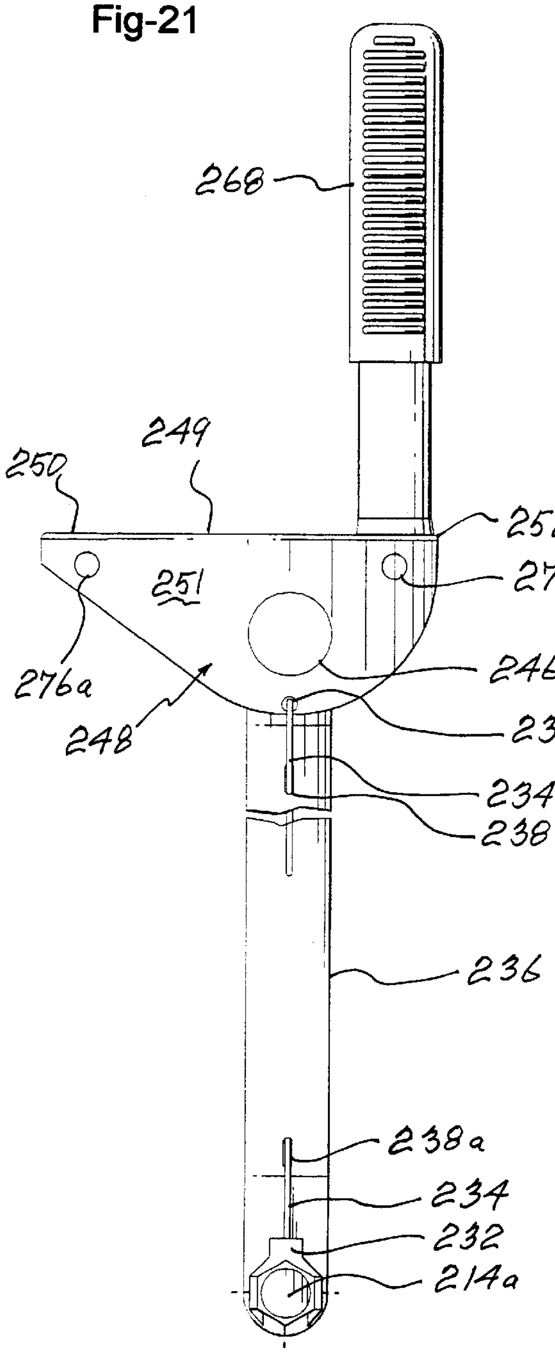
FIG. 17 is a front elevation thereof.

FIG. 10 shows the manual propulsion assembly 130 including a lever arm 136 journaled to the axle 114. A washer 132 having an angular segment 134 cut out therein is provided for limiting the rotation movement of the lever arm 136. This movement is limited by the interaction of rib 138 in the cut out segment 134. The washer 132 is fixed to the axle 114, and as shown in FIGS. 14 and 15 thrust bearings 140 and 142 maintain the lever arm 136 in a proper radial plane relative to the axle 114.

The top of the lever arm 136 is provided with a platform 144 which extends at 90° from the lever arm 136, over the handrail 126. In fact in the present embodiment, the handrail 126 may be a circular flange extending outwardly of the rim of wheel 118. In the event the manual propulsion assembly is integrated in the manufacture of the wheelchair, a handrail per se may not be necessary but the flange 126 will be required in order to cooperate with the manual propulsion assembly as will be described. The platform 144 has a short upwardly extending flange 147 which will act as a stopper as will be described.

Figure 13:
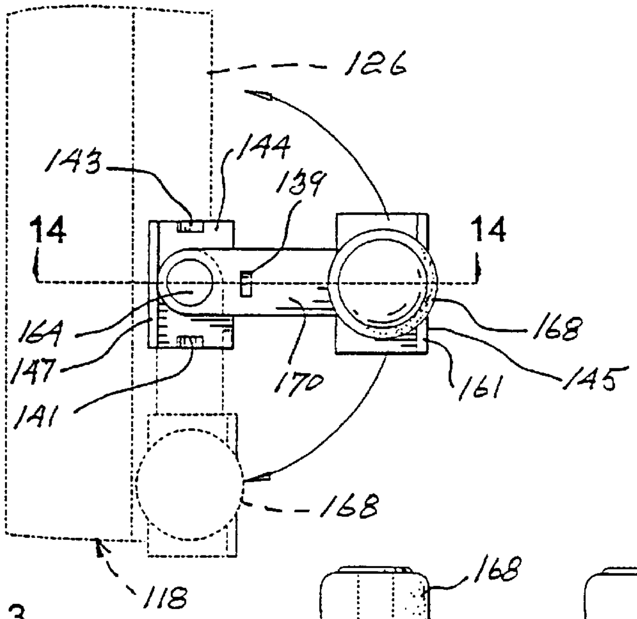
FIG. 13 is a fragmentary top plan view of the embodiment shown in FIGS. 10 through 12 but in an inoperative position.

As shown in FIGS. 10 through 15, a crank web 170 is pivotally mounted by pivot pin 164 to the platform 144 to allow the crank web 170 to rotate about an axis X and to form an arc between two positions, one forward of the lever arm and one rearward thereof, where the web 170 is somewhat tangential to the handrail 126. The flange 147 will limit this arc to 180°. In the present embodiment, the handgrip 168 is mounted to a shaft 169 (as shown in FIG. 13) which in turn is journaled to the web 170 allowing the handgrip 169 to swivel relative to the crank web 170.

A bracket 145 is fixedly mounted to the shaft 169 below the web 170 such that the bracket 145 will rotate in unison with the handle grip 168 relative to the crank web 170. The bracket 145 mounts a friction pad 159, which may be a rubber pad, with an axial component **159*a* and a radial component 159*b*. A bump 139 is located on the underside of crank web 170 and will engage either recess 141 or 143 in platform 144 when the crank web 170** is in either the forward or rearward position.

Figure 11:
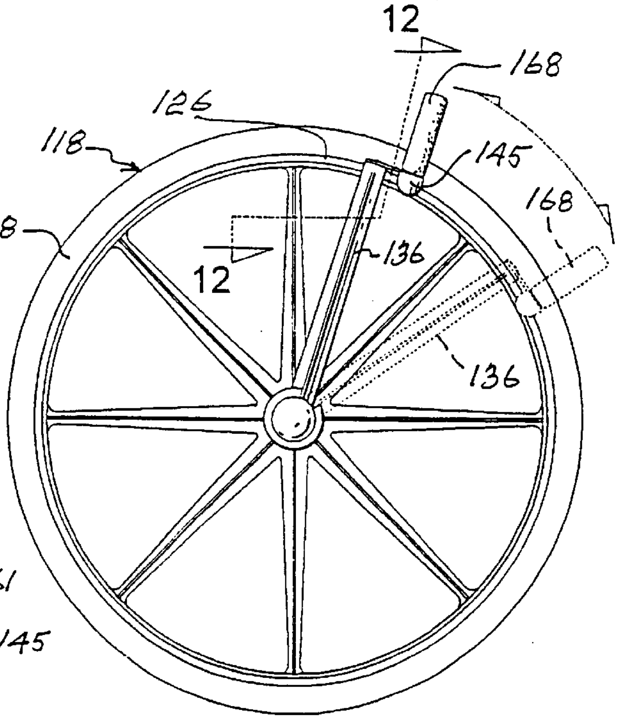
FIG. 11 is a side elevation of the embodiment shown in FIG. 10 in an operable position.

In operation, when it is required to advance the wheelchair 10, the handle grip 168 is moved forwardly of the lever arm 136 by rotating the handgrip 168, and thus the crank web 170 about the pivot pin 164 to the point where the handgrip 168 is over the handrail 126 as shown in FIG. 11. By pushing forward on the handgrip 168 the spring steel crank web 170 will bend slightly, allowing the friction pad **159*a* to come into contact and frictionally engage the handrail 126. By pushing further on the handgrip 168 towards the dotted lines position shown in FIG. 11, the handrail 126 will be entrained and thus the wheel 118 and the wheelchair will move forward. This is similar to the operation of the embodiment shown in FIGS. 1 to 9. An abutment 161 is provided on the bracket 145 to engage the sides of web 170 and limit the rotation of the bracket 145 to 1800**.

In order to reverse the direction of the wheelchair, the handle grip 168 is rotated away from the handrail 126 through its reverse arc as shown in FIG. 13 to the position shown in dotted lines where it is over the handrail 126 but rearward of the lever arm 136. Pressing downwardly or rearwardly on the handgrip 168 will cause the web 170 to give a little, where the friction pad 159 on the bracket 145 will come into contact with the handrail 126 and further rearward force on the handgrip 168 will entrain the handrail 126 and therefore the wheel 118 rearwardly, thereby moving the wheelchair in a rearward direction.

If it is necessary to apply the brakes it is merely necessary to move the handgrips 168 inwardly towards the occupant whereby the radial component of the friction pad **159*b* will come into contact with the sides of the handrail 126**, and this whether the handgrip is in a forward or rearward position.

The bracket 145 must be maintained in an aligned position so that it contacts the handrail 126 properly. However, the width of the bracket 145 will ensure that, when the handgrip 168 is moved towards the handrail, it will align itself in the same radial plane as the handrail 126.

Referring now to FIGS. 16 through 22 a third embodiment is shown. The reference numerals used for the various elements in this third embodiment correspond to the reference numerals utilized in the earlier embodiments but have been raised by 200.

Figure 18:
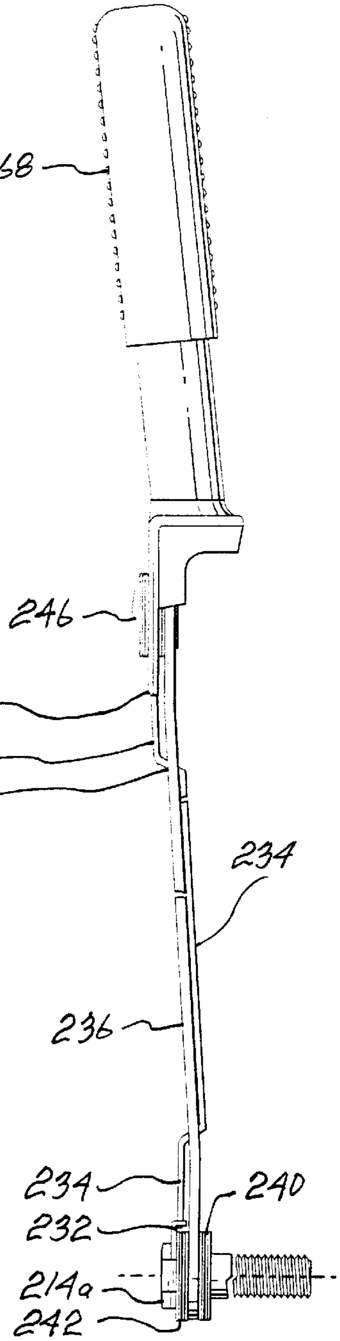
FIG. 18 is a side elevation of the assembly in accordance with FIG. 16.
Figure 20:
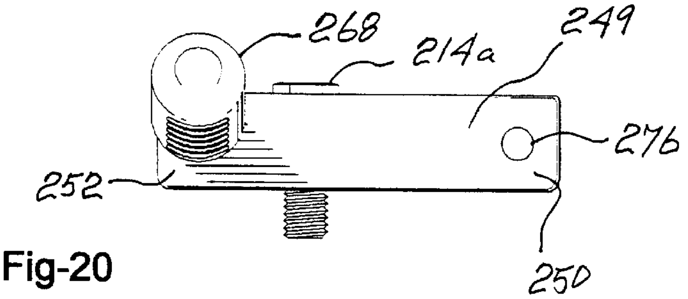

Thus, a lever 236 may be made of a flat metal bar such as stainless steel and is journaled to the axle 214, between a pair of washers 240 and 242 as shown in FIG. 18. In this case the axle 214 is in the form of a bolt with a head **214*a*. A spring bracket 232 is mounted between the hexagonal head 214*a* and washer 242 as shown more clearly in FIG. 21. A pair of side wings are provided on the bracket 232 to engage a flat edge of the hexagonal head 214*a* to prevent the rotation of the bracket 232. An elongated spring steel rod 234 is fixed to the bracket 232 and is threaded through the lever 236 at slots 238*a* and 238*b* as shown in FIGS. 16 through 19. The end of the spring rod 234 is fixed through an opening 238*c* in the web 251 of rocker member 248**.

Rocker member 248 is pivotally mounted by means of pivot pin 246 to the end of the lever 236. The rocker member 248 includes a platform 249 having a wing 250 extending rearwardly thereof and a forward wing 252. A handle grip 268 extends upwardly from the platform 249 at the forward wing portion 252.

Figure 19:
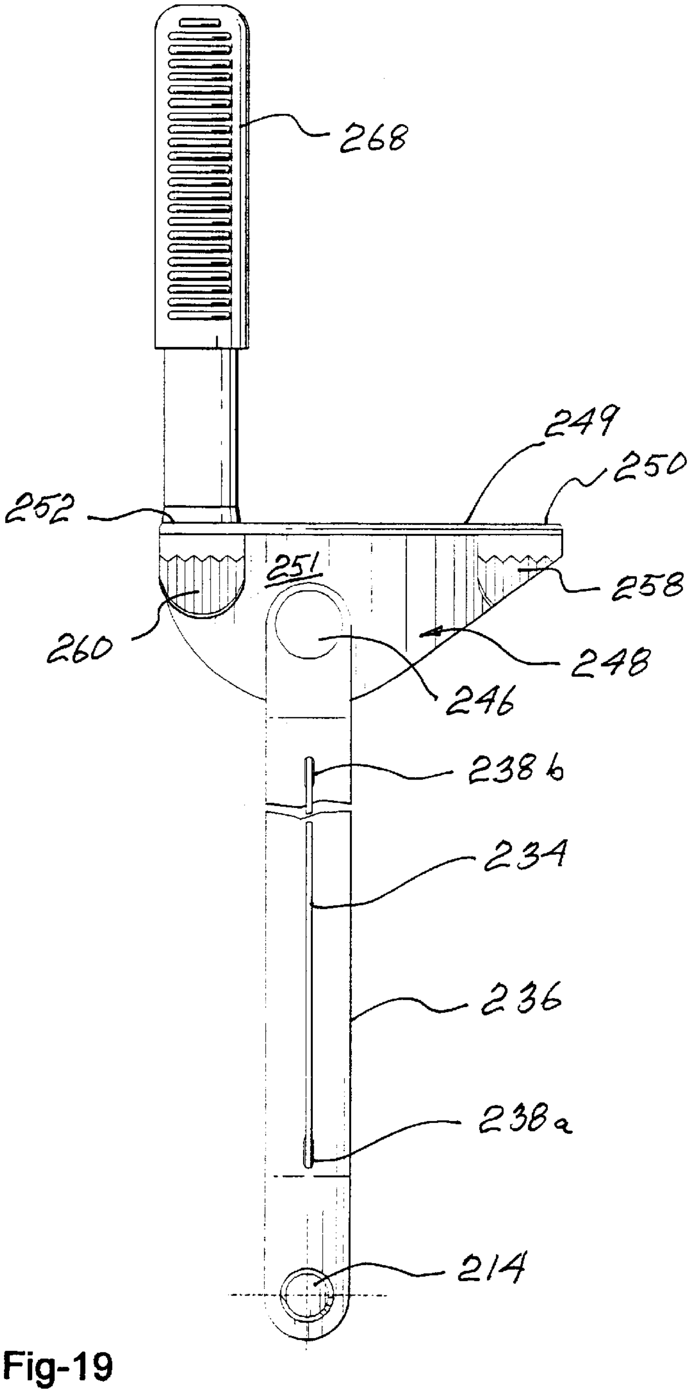
FIG. 19 is a rear elevation thereof.

A pad 258 made of resilient elastomeric material is as an L-shaped and is placed in the wing portion 250 on the underside of the platform 249 against the web 251 as shown in FIG. 19. Likewise an L-shaped elastomeric pad 260 is located in the forward wing portion 252 of the rocker member 248 as shown in FIG. 19. Apertures 276, in the platform 249, and **276*a*, in the web 251, may be provided to receive a projection from the respective pads 258 and 260 in order to better retain the pads to the rocker 248**.

Figure 22:
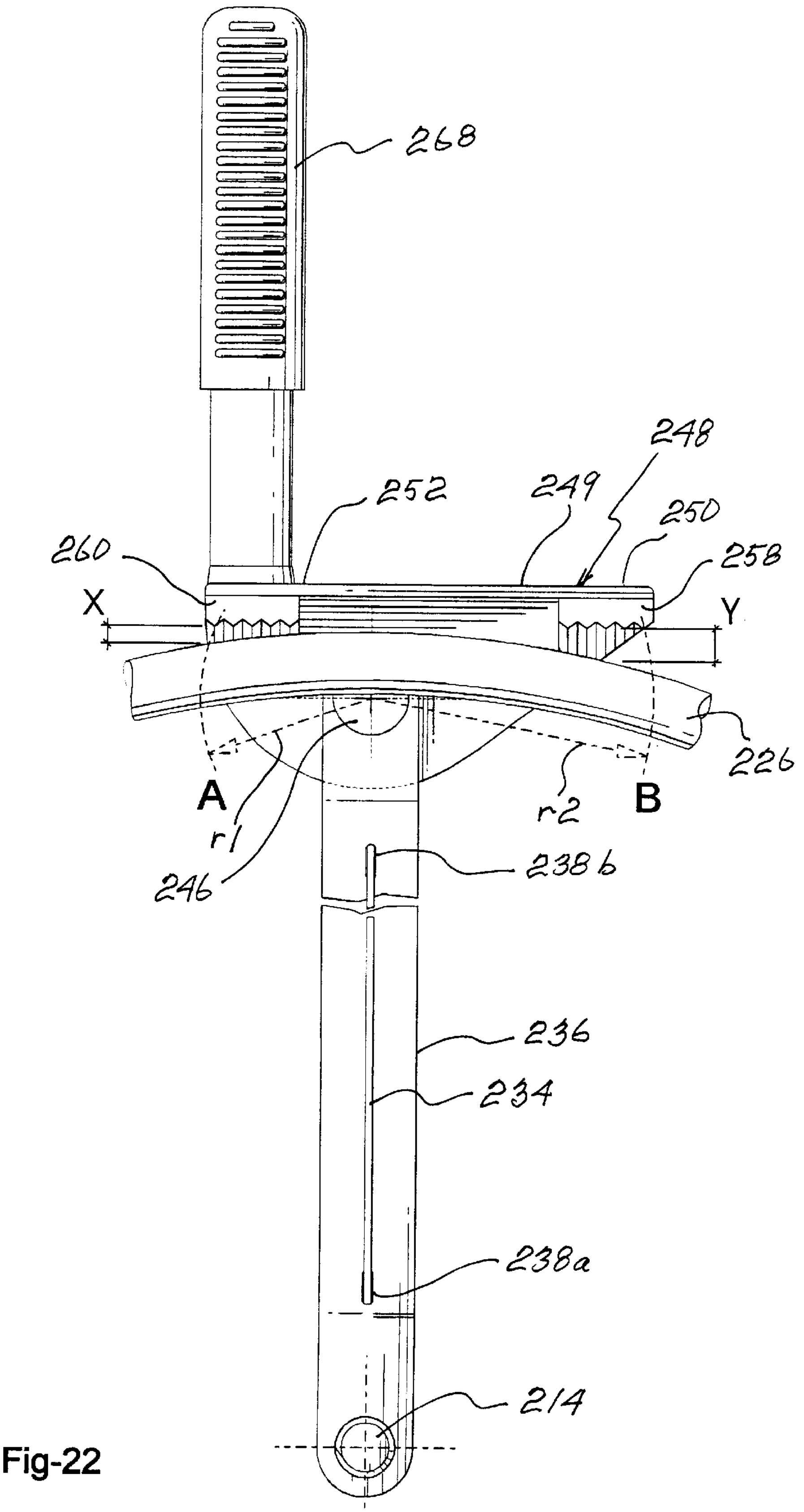
FIG. 22 is a rear elevation of the manual propulsion assembly mounted in relation to a handrail of the wheelchair shown in fragment.
Figure 23:
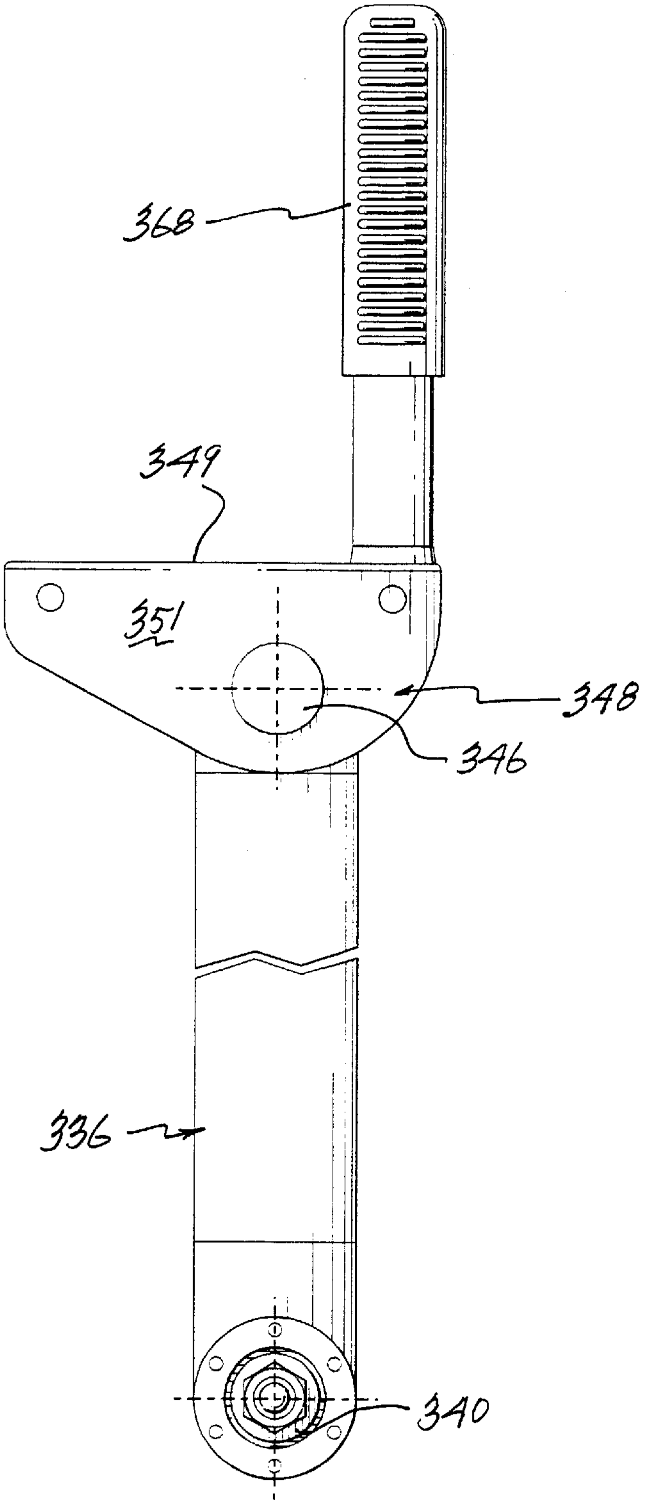
FIG. 23 is a front elevation of a still further embodiment of the manual propulsion assembly of the present invention.
Figure 24:
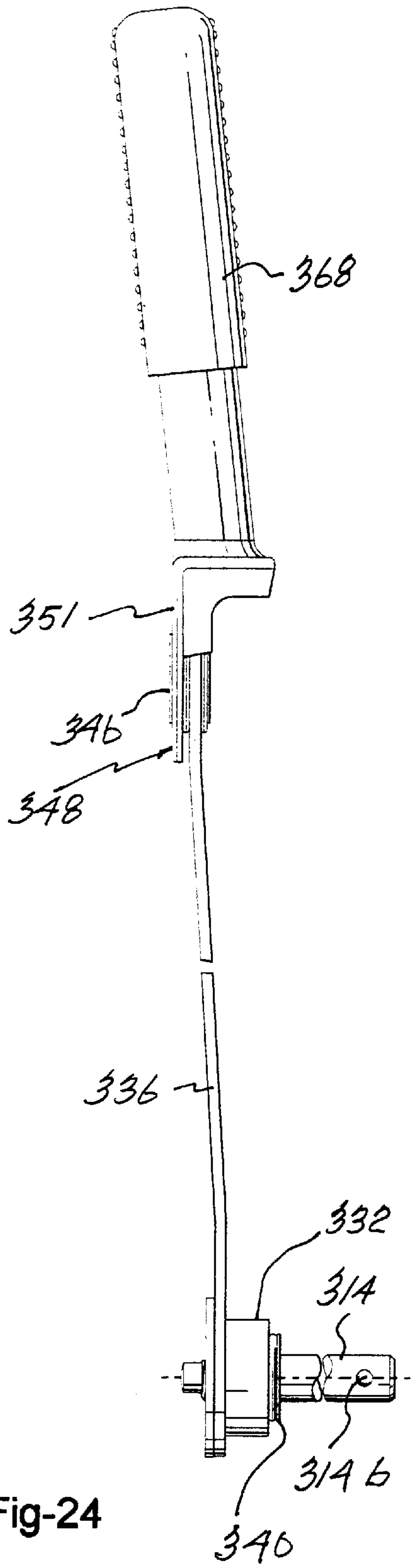
FIG. 24 is a side elevation thereof.
Figure 26:
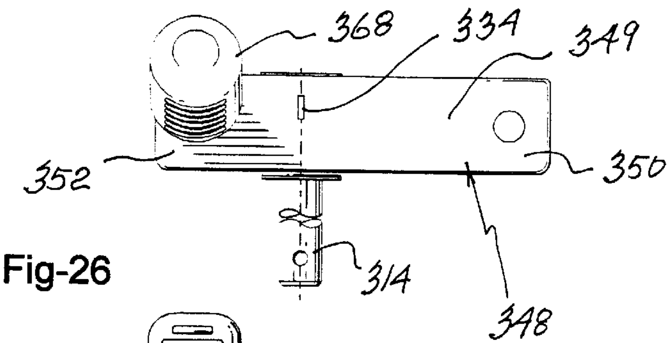
FIG. 26 is a top plan view thereof.
Figure 25:
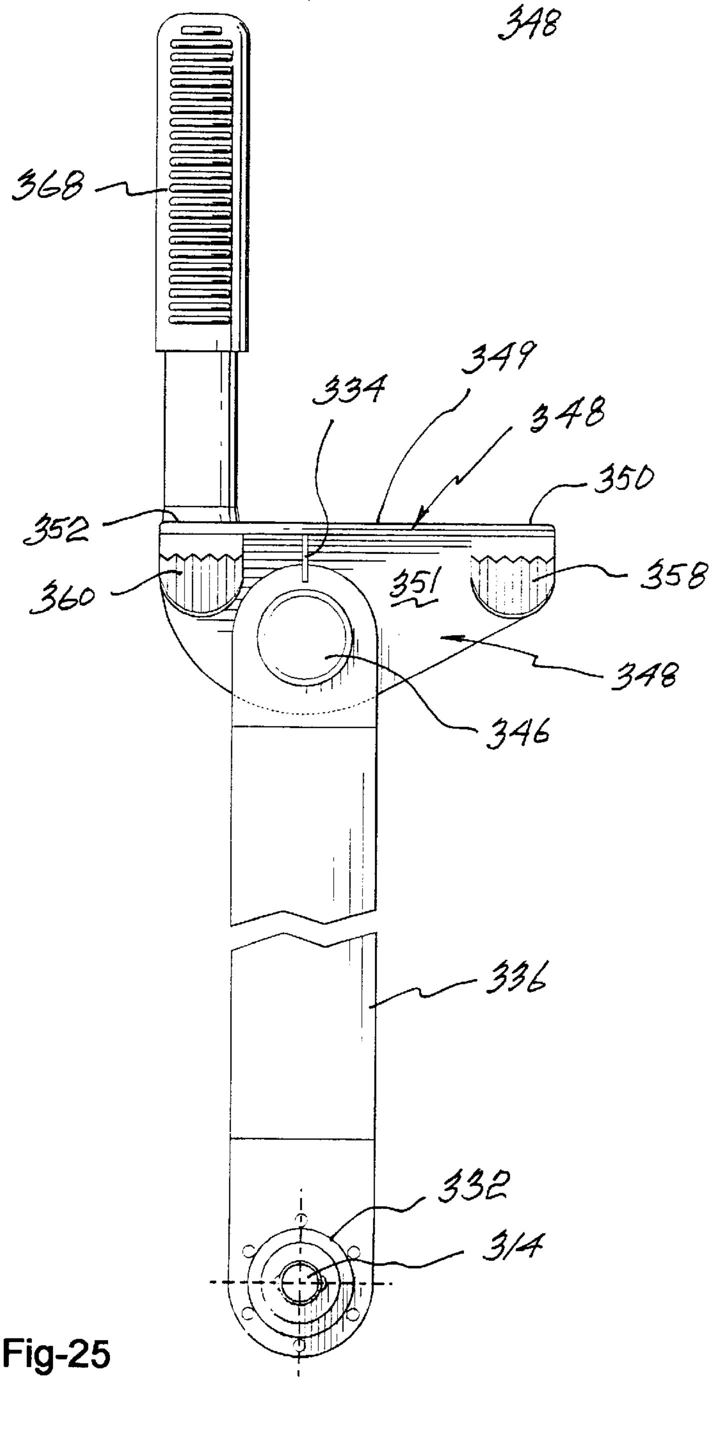
FIG. 25 is a rear elevation of the embodiment shown in FIG. 23.

FIG. 22 illustrates the relationship of the rocker 248 with a handrail 226 of a typical wheelchair. The rocker 248 is shown as being pivoted to pin 246 in a manner which is offset. In fact, radius $r^2$ of wing 250 defines arc B which is twice the dimension of $r^1$ corresponding to the wing 252 defining arc A. Thus, the relative distance that the rocker 248 will travel in arc A, so that the pad 260 engages the handrail 260, is represented by distance X which is smaller than the corresponding distance Y between the pad 258 on wing 250 to the handrail 226.

Thus, in operation, when a person sitting in the wheelchair wishes to advance the wheelchair, that person merely applies forward pressure on the handle grip 268 causing the rocker 248 to rotate counter clockwise, as shown in FIG. 22, in a forward direction, so that the pad 260 engages the handrail and the handrail and thus the respective wheel of the wheelchair advances a corresponding distance. The forward pressure on the handle grip 268 is against the urging of the spring 234. However, the spring resistance of spring 234 is only great enough to return the lever 236 and corresponding rocker 248 back to its vertical neutral position, once pressure is released from the handgrip 268.

If the person wishes to reverse the wheelchair that person must apply a pressure in the opposite direction on the handle grip 268, thereby rotating the rocker 248 counter clockwise through the greater distance Y so that the pad 258 comes into contact with the handrail 226 and the force is thus applied rearwardly. The distance Y is designed to be greater than the distance X in terms of travel so that the person does not accidentally engage the pad 258 against the handrail 226 when the lever 236 and the rocker 248 is returned to its neutral position after a forward stroke. The person would normally have a tendency of pulling back on the handgrip, slightly, with the spring 234 urging the assembly to return to its neutral position. This would sometimes cause the rocker 248 to rotate in a slight clockwise direction but not enough for the pad 258 to engage the handrail 226.

The embodiment shown in FIGS. 23 to 29 represent a further embodiment, based on the embodiment shown in FIGS. 16 to 22. The reference numerals in the embodiment of FIGS. 23 to 29 have been raised by 300 but otherwise correspond to the elements in the earlier embodiments.

Figure 27:
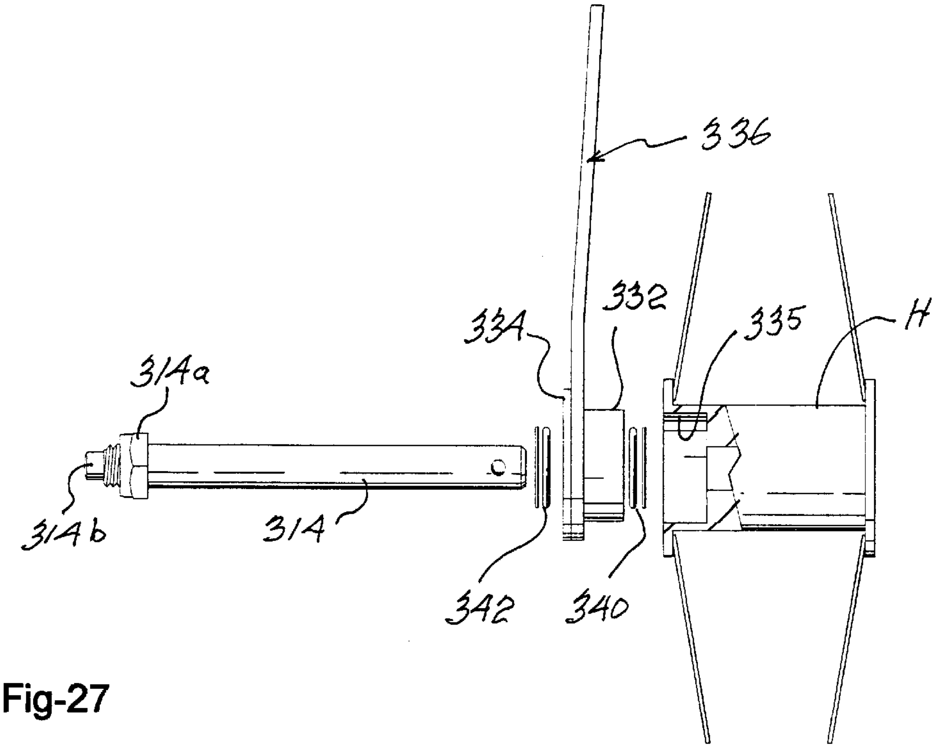
FIG. 27 is a fragmentary exploded side elevation showing the embodiment of FIG. 23 assembled to the hub of a wheel.
Figure 28:
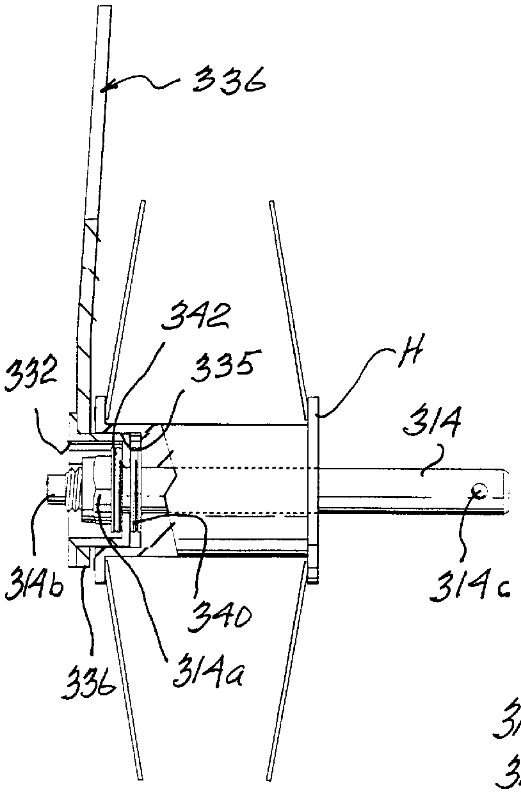
FIG. 28 is a side elevation, partly in cross-section, similar to FIG. 27 but showing the parts assembled.
Figure 29:
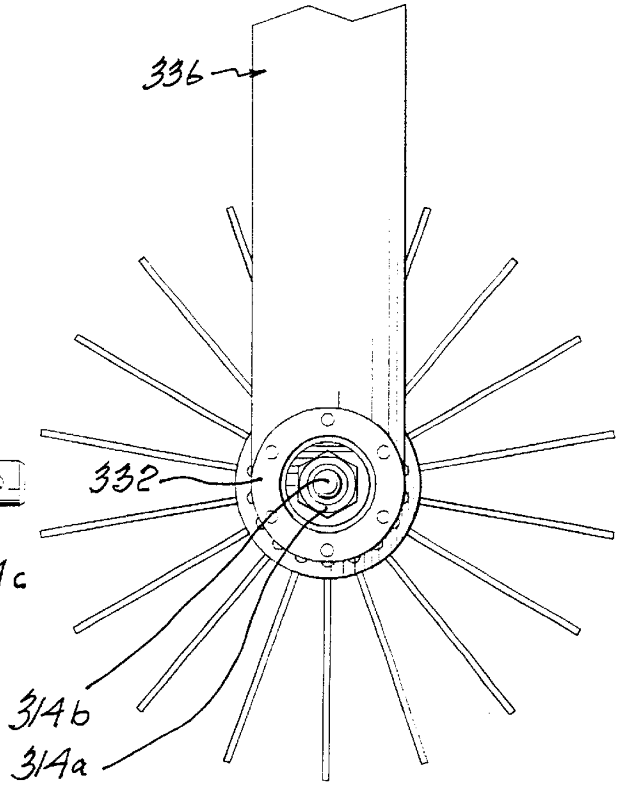
FIG. 29 is a fragmentary front elevation of the embodiment shown in FIGS. 23 to 28.

The purpose of the embodiments of FIGS. 23 to 29, is to provide a manual propulsion assembly which can be adapted to a quick release wheel axle (which is coming more and more popular on lighter wheelchairs). In this embodiment, the hub H of a typical wheel is provided with a recess 335. A cylindrical mounting bracket 332 is provided to fit within the recess 335 and mounts the lever 336. Washers 340 and 342 provide the contact with the cylindrical bracket 332 as shown in FIGS. 27 and 28.

In the case of a quick release of wheel, the axle includes a detent 314*b* and the head of the axle is a nut 314*a* which is housed within the cylindrical bracket 332. The construction of the rocker 348 and lever 336 are essentially the same as in the embodiment of FIGS. 16 to 22. However, it is not possible to mount a spring to the axle 314 which is no longer fixed but rotates freely in the hub H. Thus, a short spring 334 may be provided between the end of lever 336 and the rocker 348 to permit the rocker 348 to return to its neutral position. A bungie-cord or other device may be provided to return the lever back to its upright, neutral position after it has been extended by a force provided on the handle grip 368.

I claim:

1. A manual propulsion kit for a wheelchair when the wheelchair includes a frame with two large wheels on either side of the frame journaled to axles on the frame, each of the large wheels mounting a circular handrail, the kit including a pair of manual propulsion assemblies wherein each assembly includes a lever adapted to be journaled to one of the axles for rotational movement within a predetermined angular sector determined by a substantially vertical neutral position and a position forward of the frame, a crank handle having a crank web member pivoted for rotation, at the end of the lever arm adjacent the handrail when the lever arm is mounted to the axle, such that the crank web member defines an arc and moves between a neutral position disengaged from the handrail and a forward position engaging the handrail, a handle grip mounted to the crank web member, friction means associated with the crank web member adapted to engage the handrail when pressure is applied to the crank handle to move the web member to a rotary forward position whereby the manual propulsion assembly can be utilized to propel the wheelchair forwardly, characterized in that the crank web member includes a rocker having a web portion in a plane parallel to the lever and, the crank web member is pivoted to the end of the lever, and a platform at a right angle to the web portion, the platform having a front wing and a rear wing wherein the rear wing extends rearwardly a greater distance from a longitudinal axis of the lever member than the forward extent of the front wing and the crank handle grip is mounted in the front wing.

2. The manual propulsion kit as defined in claim 1, wherein the friction means includes L-shaped elastomeric pads provided underneath the platform and adjacent the web portion of the crank web member corresponding to the front and rear wings so as to frictionally engage the handrail.

3. The manual propulsion kit as defined in claim 2, wherein the extent of the rear wing from the axis through the lever is twice the extent of the forward wing.

4. The manual propulsion kit as defined in claim 1, wherein a spring bracket is mounted to the axle and is connected to the lever member in order to define the predetermined angular section of movement of the lever.

5. The manual propulsion kit as defined in claim 4, wherein a spring member is connected between the top of e lever member and the crank web member in order to urge the crank web member to a neutral position relative to the lever member.

6. The manual propulsion kit as defined in claim 5, wherein the spring member extending from the spring bracket and connected to the lever is the same spring member that connects the lever member to the crank web member.

7. The manual propulsion kit as defined in claim 1, wherein the lever arm rotates on the axle and the axle is a quick release axle.

8. The manual propulsion kit as defined in claim 7, wherein the lever is fixedly mounted to a cylindrical bracket which is mounted for rotation on the axle and spring means extend between the wheelchair and the lever for providing the predetermined angular sector.

* * * * *